(12) United States Patent
Reekie et al.

(10) Patent No.: US 6,240,224 B1
(45) Date of Patent: May 29, 2001

(54) COATED OPTICAL FIBER

(75) Inventors: Laurence Reekie, Southampton (GB); Lu Chao, Singapore (SG)

(73) Assignee: University of Southhampton, Southhampton (GB)

( * ) Notice: Subject to any disclaimer, the term of this patent is extended or adjusted under 35 U.S.C. 154(b) by 0 days.

(21) Appl. No.: 09/328,327

(22) Filed: Jun. 9, 1999

(30) Foreign Application Priority Data

Oct. 16, 1998 (GB) .................................................. 9822477

(51) Int. Cl.⁷ .............................. G02B 6/34; B05D 5/06; H01S 3/00
(52) U.S. Cl. ............................. 385/37; 385/31; 385/123; 385/127; 385/128; 427/163.2; 359/341
(58) Field of Search .................................. 385/12, 13, 31, 385/37, 123, 127, 128; 427/163.2; 359/341; 372/6

(56) References Cited

U.S. PATENT DOCUMENTS

| | | | |
|---|---|---|---|
| 5,930,420 | * | 7/1999 | Atlins et al. .............................. 385/37 |
| 5,995,697 | * | 11/1999 | Byron et al. ........................... 385/128 |
| 6,067,392 | * | 5/2000 | Wakami et al. ......................... 385/37 |
| 6,069,988 | * | 5/2000 | Kokura et al. ........................... 385/37 |
| 6,097,862 | * | 8/2000 | Abramov et al. ........................ 385/37 |
| 6,104,852 | * | 8/2000 | Kashyap ................................ 385/123 |

OTHER PUBLICATIONS

Automated In–Line Production Of Fiber Bragg Gratings Using Special Coatings, Singh et al., ECOC 97, Sep. 22–25, 1997.

Mechanical strength characteristics of tin–codoped germanosilicate fibre Bragg gratings by writing through UV–transparent coating, Imamura et al., Electronics Letters, May 14, 1998, vol. 34 No. 10.

* cited by examiner

*Primary Examiner*—Brian Healy
(74) *Attorney, Agent, or Firm*—Bracewell & Patterson, L.L.P.

(57) ABSTRACT

A coated optical fiber comprises a coating, an optical fiber, at least one waveguiding region and an index grating. The waveguiding region contains at least one photosensitive region, the index grating is formed by writing through the coating using UV light, and the coating transmits UV light at the wavelength at which the index grating is written.

34 Claims, 3 Drawing Sheets

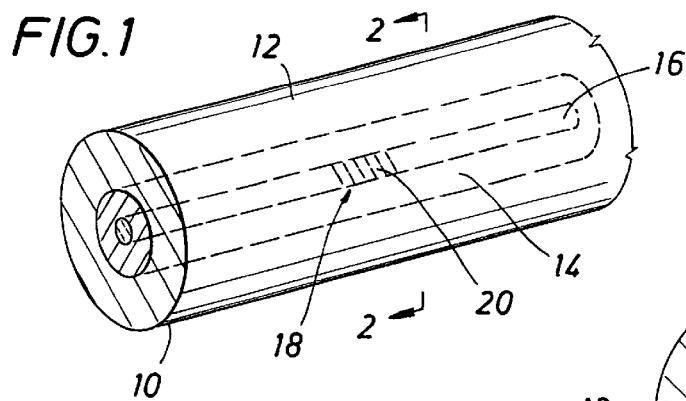
FIG. 1
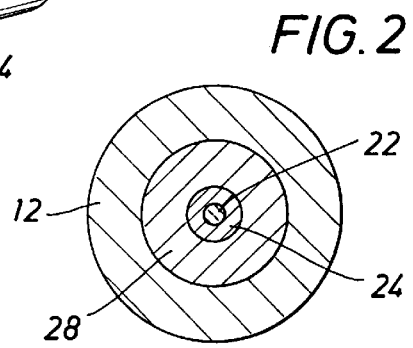
FIG. 2
FIG. 3a FIG. 3b FIG. 3c
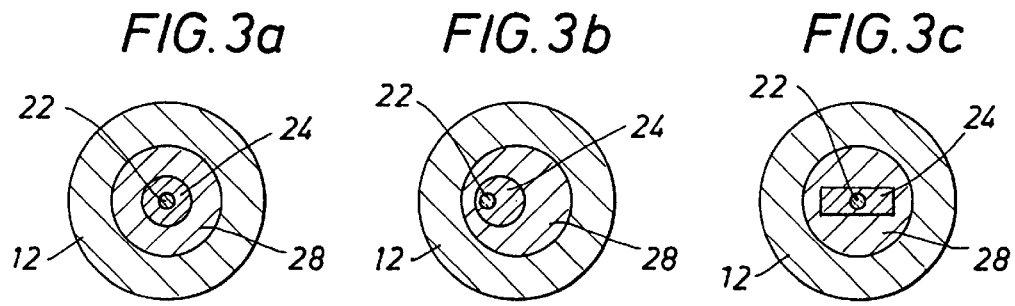
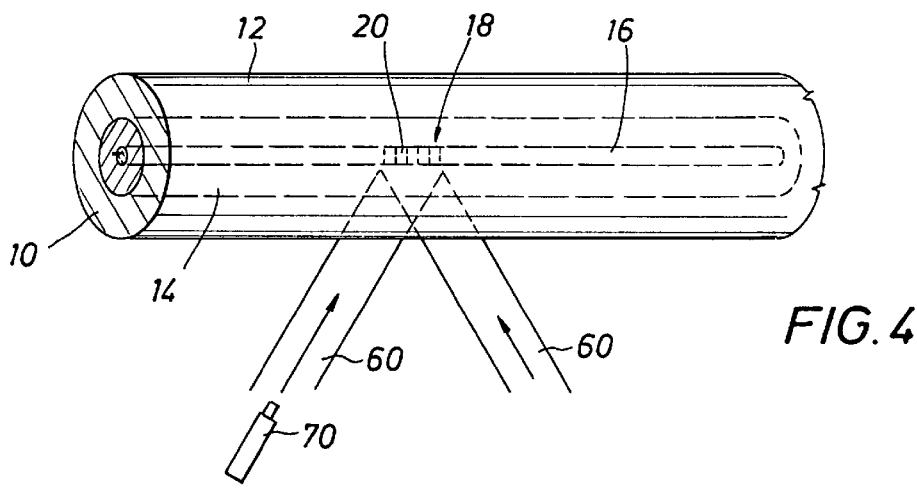
FIG. 4
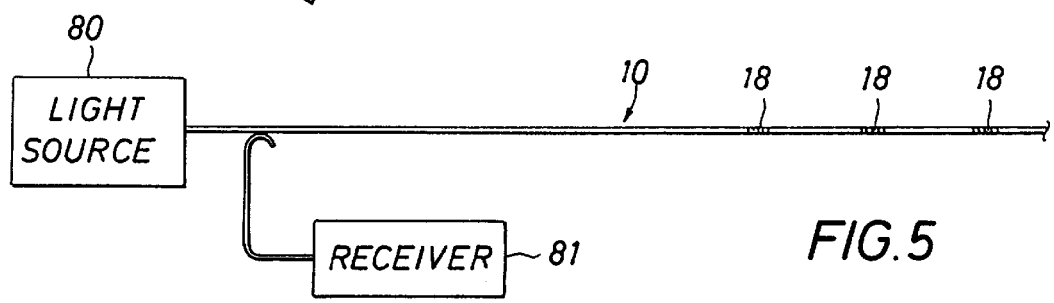
FIG. 5

COATED OPTICAL FIBER

FIELD OF THE INVENTION

The invention relates generally to the field of fiber optics and, more particularly, to a coated optical fiber with improved ease of manufacture and reliability.

BACKGROUND OF THE INVENTION

Fiber Bragg gratings are widely used in the fields of optical fiber communication and fiber sensor systems. These Bragg gratings have a number of uses in fiber optics, notably as filters and reflectors. In a known process of fiber grating fabrication, all coatings must be stripped off before the grating can be inscribed or written and, in order to preserve the mechanical strength of the fiber, it must be re-coated soon after the grating is written. This method is time consuming and has the potential of reducing the fiber strength due to exposure of the bare fiber to the air.

To solve this problem in the art of inscribing fiber Bragg gratings, a number of solutions have been proposed. These include using a specially developed UV-transparent polymer coating, writing the grating using near UV light around 330 nm instead of at more conventional wavelengths, writing on-line as the fiber is being pulled, and using a specially developed coating which can be removed thermally, then immediately re-coating in an automated production system.

The polymer used in Espindola et al., Fibre Bragg Grating Written Through a Fiber Coating, although it has a lower absorption than the normal UV-curable polymer coating, still has a strong absorption at 248 nm or 257 nm. This increases the grating writing time and reduces the mechanical strength of the fiber when higher UV exposure power is used. In Starodubovet al., Efficient Bragg grating fabrication in a fibre through its polymer jacket using near-UV light, a specially developed phase mask is needed in order to operate at the non-standard wavelength. In addition, care is also required to control the average laser power in order to reduce damage to the coating. On-line production of fiber gratings, such as that described in Dong et al., Single pulse Bragg gratings written during fibre drawing, is limited to the manufacture of gratings which can be made with a single laser pulse.

The method proposed in Singh et al., Automated In-Line Production of Fibre Bragg Grating Using Special Coatings, although attractive, requires both a special coating and an automatic production system. The thermally strippable coating also has a low heat resistance in many applications.

SUMMARY OF THE INVENTION

The present invention provides the ability to write a fiber grating through standard fiber coating at a wavelength of 248 nm. We have shown that the scheme is not only simple but also has several advantages over other previously demonstrated techniques. The ability to write through the fiber coating is most useful since it will significantly simplify the grating writing process, particularly for long arrays of gratings as required for fiber sensors. At the same time, the longer possible writing time allows more complicated grating structures to be written. This is important for WDM devices and some sensor applications. The better heat resistance not only means that it can be used in many different applications but also allows the grating to be annealed if there is such a requirement, e.g. after hydrogen loading.

An object of the present invention is to improve on known apparatus by writing of a fiber grating through a coating with a method which provides greater reliability and lower cost.

According to a non-limiting embodiment of the present invention, there is provided a coated optical fiber comprising a coating, an optical fiber, at least one waveguiding region and an index grating, in which the waveguiding region contains at least one photosensitive region, and in which the index grating is formed by writing through the coating using UV light, and in which the coating transmits UV light at the wavelength at which the index grating is written.

The index grating may be an optical fiber Bragg grating, a long-period grating, or a blazed grating. The waveguiding region preferably comprises a core and a cladding. The core may be photosensitive, or the cladding may be photosensitive. The cladding may be depressed in that its refractive index is less than the refractive index of the surrounding silica.

The waveguiding region may comprise a core and a plurality of claddings. The index grating may be formed in the core, or in at least one of the claddings, or in both the core and at least one of the claddings. The photosensitive region may be formed by hydrogen loading of the coated optical fiber prior to the writing of the index grating. This is usually achieved by placing the optical fiber into a hydrogen atmosphere at 20° C. to 100° C. and at a pressure of 100 bar to 1000 bar.

Alternatively, the photosensitive region may be formed by doping the optical fiber perform during manufacture with one or more of the dopants germania, tin, boron, or cerium.

The coating should allow the transmission of the UV light which is used to write the grating without the requirement for the coating to be removed. The coating should not contain a photo-initiator, since photo-initiators are often UV sensitive. Nevertheless, if such a photo-initiator is used, then it must be transparent at the wavelength at which the index grating is written.

The coating may have a refractive index less than the refractive index of the outside of the optical fiber, or equal to the refractive index of the outside of the optical fiber, or greater than the refractive index of the optical fiber.

The coated optical fiber may be cured by thermal annealing in which the coated optical fiber is thermally treated after the index grating is formed. This process is important because it stabilizes the long-term properties of the index grating.

The coating is preferably a thermally cured coating because this allows a coating to be selected which does not contain a photo-initiator. Moreover, it allows the coated optical fiber to be more easily thermally cured after the index grating is formed. This coating choice is therefore compatible with the preferred method of forming the photosensitive region, namely hydrogen loading of the coated optical fiber prior to the writing of the index grating. Using such a thermally cured coating which does not require removing the coating prior to writing the index grating increases the reliability of the coated optical fiber.

According to a first embodiment of the invention, there is provided an apparatus and a method for the manufacture of the coated optical fiber in which the optical fiber is drawn with the coating and UV light is written through the coating to form the index grating.

The source of the UV light may be a laser operating in the region 220 nm to 350 nm. The laser may be an excimer laser, a frequency doubled Argon laser, or a frequency doubled dye laser, a frequency quadrupled high-power laser, a nitrogen laser, an optical parametric oscillator, an Argon ion laser, a Krypton ion laser or a copper vapor laser.

The index grating may be written using a phase mask, using an interferometer, or using an amplitude mask.

Alternatively, it may be written point by point, i.e., one element of the grating at a time According to a second embodiment of the invention, there is provided apparatus for sensing physical parameters which apparatus comprises a light source, a receiver, and at least one coated optical fiber.

According to a third embodiment of the invention, there is provided an optical filter comprising at least one coated optical fiber.

According to a fourth embodiment of the invention, there is provided a fiber laser comprising at least one coated optical fiber and in which the waveguiding region contains at least one amplifying region containing at least one rare-earth dopant.

According to a fifth embodiment of the invention, there is provided an optical fiber amplifier comprising at least one coated optical fiber and in which the waveguiding region contains at least one amplifying region containing at least one rare-earth dopant.

BRIEF DESCRIPTION OF THE DRAWINGS

The invention will now be described solely by way of example and with reference to the accompanying drawings in which:

FIG. 1 is a diagram showing the transmission through a thermally cured coating;

FIG. 2 is a diagram showing the transmission through an index grating written through a thermally cured coating;

FIGS. 3a,b,c are diagrams showing the transmission through an index grating not written through a coating;

FIG. 4 is a diagram of an embodiment of the present invention;

FIG. 5 is a diagram showing a core and a cladding;

DETAILED DESCRIPTION OF A PREFERRED EMBODIMENT

Figure 6:
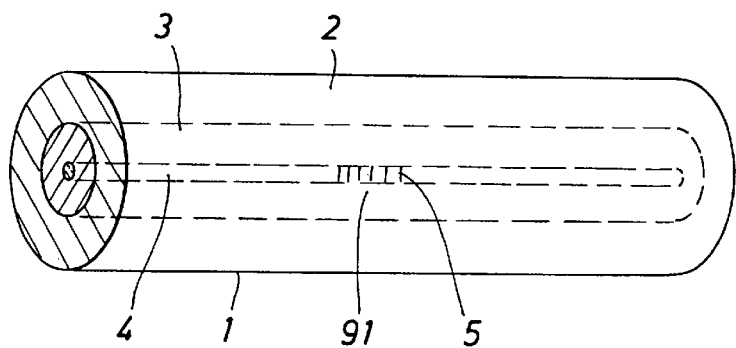
FIG. 6 is a diagram showing a core and multiple claddings.

As shown in FIGS. 3a, 3b, and 3c, the various layers of the coated optical fiber 10 need not be concentric cylinders. FIG. 3a depicts coaxial elements comprising the core 22, the inner cladding 24, the outer cladding 28, and the coating 12. However, FIG. 3b depicts acoaxial elements comprising the core 22, the inner cladding 24, the outer cladding 28, and the coating 12. As shown in FIG. 3c, the inner cladding 24 may even describe a rectangular cross sectional aspect.

FIG. 1 depicts the essential structure of a coated optical fiber 10 of this invention. The coated optical fiber 10 comprises a coating 12, an optical fiber 14, at least one waveguiding region 16 and an index grating 18, in which the waveguiding region 16 contains at least one photosensitive region 20, and in which the index grating 18 is formed by writing through the coating 12 using UV light, and in which the coating 12 transmits UV light at the wavelength at which the index grating 18 is written. The index grating 18 may be an optical fiber Bragg grating, a long-period grating or a blazed grating.

FIG. 2 depicts a sectional view of the coated optical fiber 10, as seen along section view 2—2. The fiber 10 comprises a core 22, surrounded by an inner cladding 24, an outer cladding 28, and the coating 12. One feature of the present invention lies in the formation of the grating 18 through the coating. The core 22 may be photosensitive, or the cladding 24 may be photosensitive. The cladding 24 may be depressed in that its refractive index is less than the refractive index of the surrounding silica within the optical fiber 14. Further, the waveguiding region may include more than two claddings. The index grating 18 may be formed in the core 22, or in at least one of the claddings, or in both the core and at least one of the claddings.

The photosensitive region 20 may be formed by hydrogen loading of the coated optical fiber 10 prior to the writing of the index grating 18. This is usually achieved by placing the coated optical fiber 10 into a hydrogen atmosphere at 20° C. to 100° C. and at a pressure of 100 bar to 1000 bar.

Alternatively, the photosensitive region 20 may be formed by doping the optical fiber preform from which the coated optical fiber 10 is drawn during manufacture with one or more of the dopants germania, tin, boron or cerium.

The choice of coating 12 is important in that it should allow the transmission of the UV light which is used to write the index grating 18 without the requirement for the coating 12 to be removed.

It is desirable that the coating 12 does not contain a photo-initiator which is often UV sensitive. Nevertheless, if such a photo-initiator is used, then it must be transparent at the wavelength at which the index grating 18 is written.

The coating 12 may have a refractive index less than the refractive index of the outside of the optical fiber 14, or equal to the refractive index of the outside of the optical fiber 14, or greater than the refractive index of the optical fiber 14.

The coated optical fiber 10 may be cured by thermal annealing in which the coated optical fiber 10 is thermally treated after the index grating 18 is formed. This process is important because it stabilizes the long-term properties of the index grating 18. This stabilization is in terms of its wavelength properties and its amplitude properties and is thus of great importance.

It is preferred that the coating 12 is a thermally cured coating because this allows a coating to be selected which does not contain a photo-initiator. Moreover, it allows the coated optical fiber 10 to be more easily thermally cured after the index grating 18 is formed. This coating choice is therefore compatible with the preferred method of forming the photosensitive region, namely hydrogen loading of the coated optical fiber 10 prior to the writing of the index grating 18.

The advantage of using such a thermally cured coating which does not necessitate the removal of the coating 12 prior to writing the index grating 18 will increase the reliability of the coated optical fiber 10. This aspect of the invention facilitates writing numerous gratings into the same fiber.

FIG. 4 shows an apparatus for the manufacture of the coated optical fiber 10 in which the optical fiber 10 is drawn with the coating and UV light 60 is written through the coating 12 to form the index grating 18.

The source of the UV light is a laser 70 which may operate in the region 220 nm to 350 nm. The laser 70 maybe an excimer laser, a frequency doubled Argon laser, or a frequency doubled dye laser, a frequency quadrupled high-power laser, a nitrogen laser, an optical parametric oscillator, an Argon-ion laser, a Krypton ion laser or a copper vapor laser.

The index grating 18 may be written using a phase mask, using an interferometer, or using an amplitude mask. Alternatively, it may be written point by point, that is one element of the grating at a time.

FIG. 5 shows apparatus for sensing physical parameters which apparatus comprises a light source 80, a coated optical fiber 10 containing a plurality of index gratings 18, and a receiver 81 for interrogating the light returned from the index gratings 18. The receiver 81 may comprise an optical spectrum analyzer which measures the wavelength shift of the light returned by the index gratings 18. This wavelength shift can be related to the variation in temperature, strain, pressure, or other physical parameters by means of carefully designing the sensing head.

FIG. 6 shows an optical filter 91 comprising at least one coated optical fiber 10.

Figure 7:
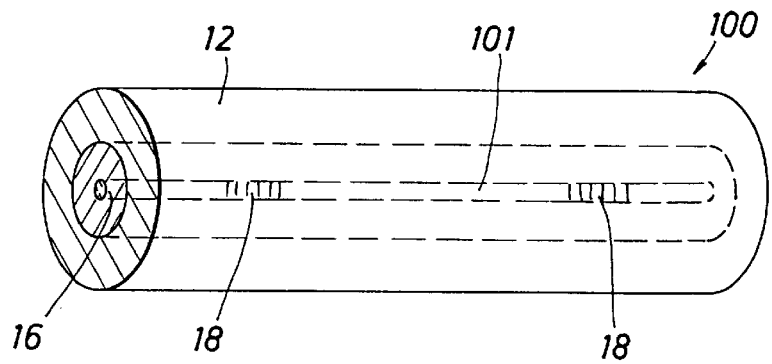
FIG. 7 is a diagram showing an index grating being written.

FIG. 7 shows a fiber laser 100 comprising at least one coated optical fiber and in which the waveguiding region 16 contains at least one amplifying region 101 containing at least one rare-earth dopant.

Figure 8:
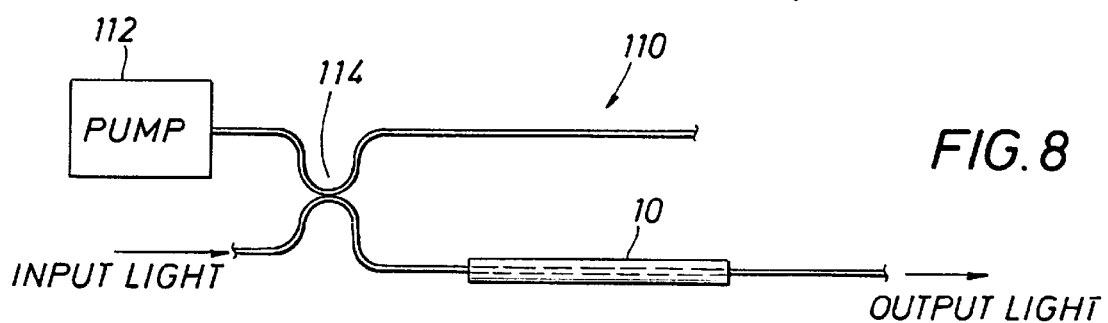
FIG. 8 is a diagram of a sensing apparatus.

FIG. 8 shows an optical fiber amplifier 110 comprising a pump 112, a coupler 114, and at least one coated optical fiber 10 and in which the waveguiding region 16 contains at least one amplifying region 101 containing at least one rare-earth dopant. Index gratings are used in optical fiber amplifiers for gain flattening or for the removal of amplitude spontaneous emission.

Specific Embodiment and Experimental Results

Figure 9:
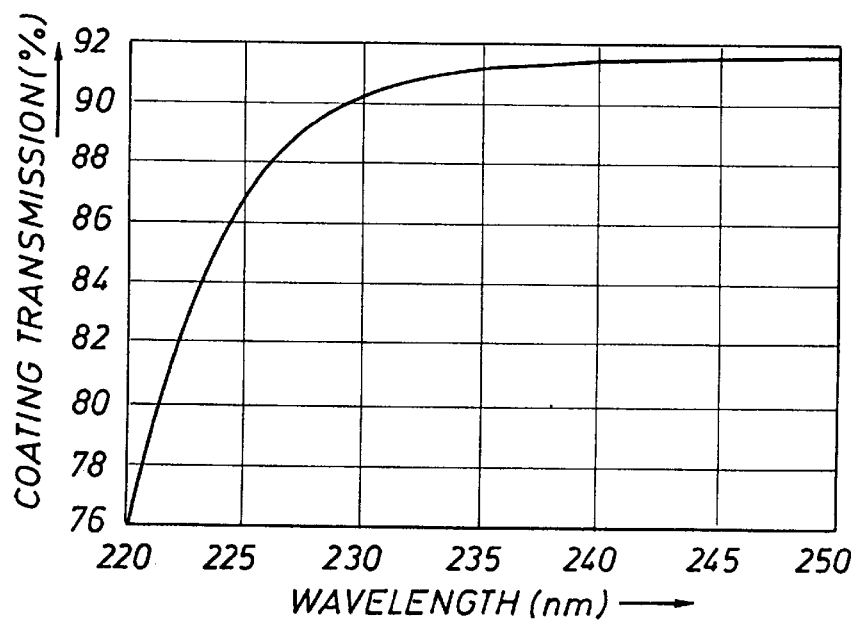
FIG. 9 is a diagram of an optical filter.

The coating used is General Electric RTV615 silicone rubber. This coating is thermally curable and thus does not require a UV absorbing photo-initiator. With a normal specified useful temperature range of −60° C. to 204° C. the coating has a better thermal tolerance than standard UV curable polymer coating. To determine the absorption of the material in the UV region, a 150 $\mu$m thick film of cured silicone rubber was formed between two silica plates. The absorption characteristics of the coating as measured using a spectrophotometer are shown in FIG. 9.

Figure 10:
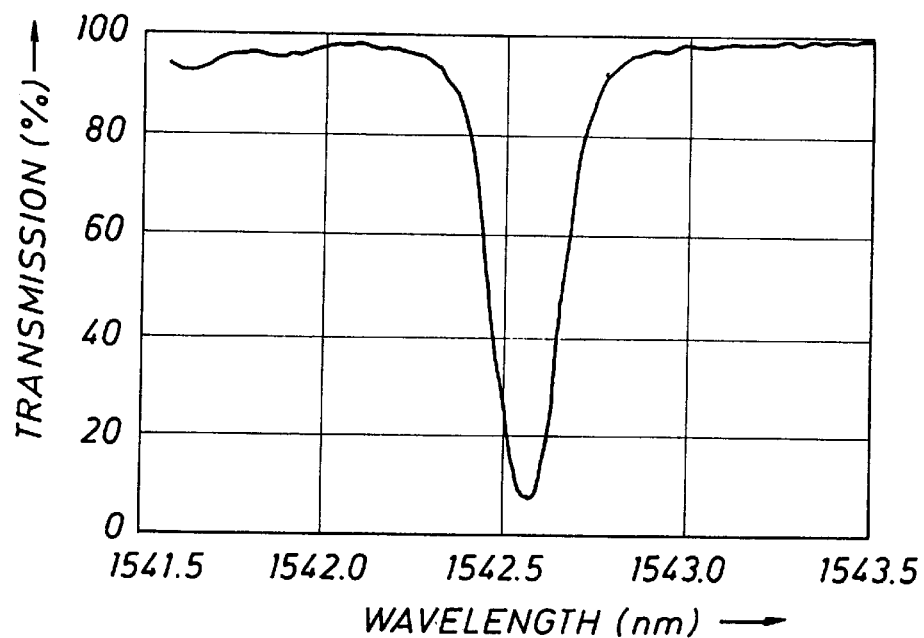
FIG. 10 is a diagram of a fiber laser.
Figure 11:
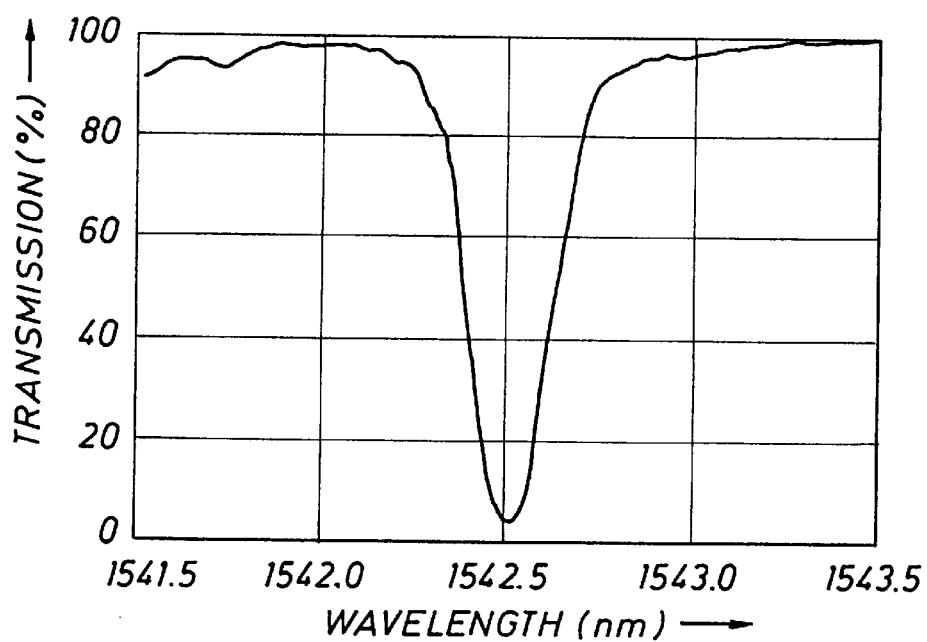
FIG. 11 is a diagram of an optical amplifier.

A silica plate was used as the reference to improve the measurement accuracy. The result clearly indicates a transmission of almost 92% at a wavelength of 248 nm. This low UV absorption suggests the possibility of Bragg grating writing through the silicone rubber coating using either a frequency-doubled Ar+-ion laser at 244 nm or a KrF excimer laser at 248 nm. To verify this, a photosensitive boron co-doped silica/germania photosensitive fiber (NA=0.12, 1 cut-off−1050 nm, diameter=125, $\mu$m) was coated with the silicone rubber coating. The average coating thickness was 60 $\mu$m, similar to a normal fiber coating. The grating inscription was carried out using a 248 nm excimer laser and a 1540 mn phase mask optimized for 248 nm operation. A 1 cm long grating was produced by scanning a 3 mm wide beam over a section of the coated fiber, each individual part of the fiber receiving an exposure of 3 minutes at 20 Hz. The spectrum was monitored using an optical spectrum analyzer and 1.55 $\mu$m LED. The individual pulse fluence was set at 64 mJ/cm$^2$. A grating with a reflectivity of 92 % was obtained, limited by the resolution of the optical spectrum analyzer (approximately 0.1 nm), corresponding to an index change of 2.4×10−4, and the resulting grating is shown in FIG. 10. For comparison, the coating was stripped off and the fiber was exposed under identical conditions, and this grating is shown in FIG. 11. The almost identical result suggests that the effect of writing through the coating is almost negligible. The background ripple outside the grating bandwidth is mainly due to variations in the LED spectrum. with the silicone rubber To verify the heat resistance of the coating a fiber with the silicone rubber coating was placed together with a fiber coated with UV curable polymer on a hot plate with a temperature of 300° C. for 3 minutes. A visible darkening of the polymer was observed. However, the effect on the silicone rubber coated fiber was negligible.

It is to be appreciated that the embodiments of the invention described above with reference to the accompanying drawings have been given by way of example only and that modifications and additional components may be provided to enhance the performance of the apparatus or of the manufacturing method. Further, the principles, preferred embodiment, and mode of operation of the present invention as described in the foregoing specification are not to be construed as limited to the particular forms disclosed, since these are regarded as illustrative rather than restrictive. Moreover, variations and changes may be made by those skilled in the art without departing from the spirit of the invention.

We claim:

1. A coated optical fiber comprising a coating, an optical fiber, at least one waveguiding region and an index grating, wherein the waveguiding region contains at least one photosensitive region;

wherein the index grating is formed by writing through the coating using UV light;

wherein the coating transmits UV light at the wavelength at which the index grating is written;

and wherein the cladding is depressed.

2. A coated optical fiber according to claim 1 wherein the index grating is an optical fiber Bragg grating.

3. A coated optical fiber according to claim 1 wherein the index grating is a long-period grating.

4. A coated optical fiber according to claim 1 wherein the index grating is a blazed grating.

5. A coated optical fiber according to claim 1 wherein the waveguiding region comprises a core and a cladding.

6. A coated optical fiber according to claim 5 wherein the core is photosensitive.

7. A coated optical fiber according to claim 5 wherein the cladding is photosensitive.

8. A coated optical fiber according to claim 1 wherein the waveguiding region comprises a core and a plurality of claddings.

9. A coated optical fiber according to claim 8 wherein the index grating is formed in the core.

10. A coated optical fiber according to claim 8 wherein the index grating is formed in at least one of the claddings.

11. A coated optical fiber according to claim 1 wherein the photosensitive region is formed by hydrogen loading of the coated optical fiber prior to the writing of the index grating.

12. A coated optical fiber according to claim 1 wherein the photosensitive region contains a dopant selected from the group comprising germania, boron, tin, and cerium.

13. A coated optical fiber according to claim 1 wherein the coating does not contain a photo-initiator.

14. A coated optical fiber according to claim 1 wherein the coating contains a photo-initiator which is transparent at the wavelength at which the index grating is written but which allows UV curing during the drawing process.

15. A coated optical fiber according to claim 1 wherein the coating has a refractive index less than the refractive index of the outside of the optical fiber.

16. A coated optical fiber according to claim 1 wherein the coating has a refractive index which is matched to the refractive index of the outside of the optical fiber.

17. A coated optical fiber according to claim 1 wherein the coating has a refractive index greater than the refractive index of the outside of the optical fiber.

18. A coated optical fiber according to claim 1 wherein the coating is a thermally cured coating.

19. A coated optical fiber according to claim 1 wherein the coated optical fiber is thermally treated after the index grating is formed.

20. A coated optical fiber according to claim 1 wherein the coating is a thermally cured coating and wherein the coated optical fiber is thermally treated after the index grating is formed.

21. A coated optical fiber according to claim 20 wherein the photosensitive region is formed by hydrogen loading of the coated optical fiber prior to the writing of the index grating.

22. A method of manufacturing a coated optical fiber comprising a coating, an optical fiber, at least one waveguiding region and an index grating, comprising the steps of drawing the optical fiber with the coating; and writing the index grating through the coating with UV light from a laser operating in the region 220 nm to 350 nm.

23. The method of claim 22 wherein the source of the UV light is an excimer laser.

24. The method of claim 22 wherein the source of the UV light is frequency doubled Argon laser.

25. The method of claim 22, wherein the source of the UV light is a frequency doubled dye laser.

26. The method of claim 22 wherein the source of the UV light is a frequency quadrupled high-power laser.

27. The method of claim 22 wherein the index grating is written using a phase mask.

28. The method claim 22 wherein the index grating is written using an interferometer.

29. The method of claim 22 wherein the index grating is written using an amplitude mask.

30. The method of claim 22 wherein the index grating is written point by point.

31. Apparatus for sensing physical parameters comprising a light source, a receiver, and at least one coated optical fiber, the coated optical fiber comprising a coating, an optical fiber, at least one waveguiding region and an index grating, wherein the waveguiding region contains at least one photosensitive region; wherein the index grating is formed by writing through the coating using UV light; wherein the coating transmits UV light at the wavelength at which the index grating is written; and wherein the cladding is depressed.

32. An optical filter comprising at least one coated optical fiber, the coated optical fiber comprising a coating, an optical fiber, at least one waveguiding region and an index grating, wherein the waveguiding region contains at least one photosensitive region; wherein the index grating is formed by writing through the coating using UV light; wherein the coating transmits UV light at the wavelength at which the index grating is written; and wherein the cladding is depressed.

33. A fiber laser comprising at least one coated optical fiber, the coated optical fiber comprising a coating, an optical fiber, at least one waveguiding region and an index grating, wherein the waveguiding region contains at least one photosensitive region; wherein the index grating is formed by writing through the coating using UV light; and wherein the coating transmits UV light at the wavelength at which the index grating is written, and wherein the waveguiding region contains at least one amplifying region containing at least one rare-earth dopant.

34. An optical fiber amplifier comprising at least one coated optical fiber, the coated optical fiber comprising a coating, an optical fiber, at least one waveguiding region and an index grating, wherein the waveguiding region contains at least one photosensitive region; wherein the index grating is formed by writing through the coating using UV light; and wherein the coating transmits UV light at the wavelength at which the index grating is written, and wherein the waveguiding region contains at least one amplifying region containing at least one rare-earth dopant.

* * * * *